(12) United States Patent
Kerstner et al.

(10) Patent No.: US 10,670,326 B2
(45) Date of Patent: Jun. 2, 2020

(54) VACUUM-TIGHT THROUGH-FILM BUSHING

(71) Applicants: LIEBHERR-HAUSGERATE LIENZ GMBH, Lienz (AT); LIEBHERR-HAUSGERATE OCHSENHAUSEN GMBH, Ochsenhausen (DE)

(72) Inventors: Martin Kerstner, Wurzburg (DE); Jochen Hiemeyer, Karlstadt (DE); Michael Freitag, Wurzburg (DE)

(73) Assignees: LIEBHERR-HAUSGERATE LIENZ GMBH, Lienz (AT); LIEBHERR-HAUSGERATE OCHSENHAUSEN GMBH, Ochsenhausen (DE)

( * ) Notice: Subject to any disclaimer, the term of this patent is extended or adjusted under 35 U.S.C. 154(b) by 219 days.

(21) Appl. No.: 15/547,073

(22) PCT Filed: Jan. 25, 2016

(86) PCT No.: PCT/EP2016/000122
§ 371 (c)(1),
(2) Date: Jul. 28, 2017

(87) PCT Pub. No.: WO2016/120009
PCT Pub. Date: Aug. 4, 2016

(65) Prior Publication Data
US 2018/0023880 A1    Jan. 25, 2018

(30) Foreign Application Priority Data

Jan. 29, 2015  (DE) .................. 10 2015 001 063
May 20, 2015  (DE) .................. 10 2015 006 558

(51) Int. Cl.
*H02G 3/22* (2006.01)
*F25D 23/06* (2006.01)
(Continued)

(52) U.S. Cl.
CPC ............ *F25D 23/065* (2013.01); *F25B 21/02* (2013.01); *H02G 3/22* (2013.01); *H02G 15/013* (2013.01);
(Continued)

(58) Field of Classification Search
CPC ........ F25D 23/065; F25D 21/02; F25D 23/06; F25D 2201/14; F25D 2400/40;
(Continued)

(56) References Cited

U.S. PATENT DOCUMENTS 7,446,268 B2 * 11/2008 Miettinen ............ H02G 3/0481
16/2.1
7,812,266 B2 * 10/2010 Rocks .................. H01B 17/265
16/2.1
(Continued)

FOREIGN PATENT DOCUMENTS

DE      1451113 A1    12/1968
DE     10054419 A1     5/2002
(Continued)

OTHER PUBLICATIONS

International Search Report and Written Opinion issued in corresponding International Patent Application No. PCT/EP2016/000122 (with English translation of International Search Report) dated Jul. 14, 2016 (21 pages).
(Continued)

Primary Examiner — Angel R Estrada
(74) Attorney, Agent, or Firm — Kilyk & Bowersox, P.L.L.C.

(57) ABSTRACT

The present invention relates to an apparatus for the vacuum-tight leading of an electric line through a high
(Continued)

barrier film. The apparatus comprises a hollow pipe 1 having a collar 2 projecting therefrom; a high barrier film 3 having a passage hole 4 through which the hollow pipe 1 runs; and a pressing element 5 that is arranged at the side of the high barrier film 3 that is remote from the collar 2, and that urges the high barrier film 3 toward the collar 2, with the high barrier film 3 being arranged between the collar 2 of the hollow pipe 1 and the pressing element 5. The apparatus is furthermore characterized in that an electric line runs in the hollow pipe 1 that leads from the one side of the high barrier film 3 to the other side and in that a sealant is present in the hollow pipe 1 for the vacuum-tight closing of the hollow pipe 1. It is thereby possible to provide an inexpensive electric leadthrough via which larger powers can also be transferred through a high barrier film with low loss and in a diffusion-tight manner.

15 Claims, 1 Drawing Sheet

(51) Int. Cl.
    *H02G 15/013*     (2006.01)
    *F25B 21/02*     (2006.01)
    *H01B 17/30*     (2006.01)

(52) U.S. Cl.
    CPC ...... *F25D 2201/14* (2013.01); *F25D 2400/40* (2013.01); *H01B 17/30* (2013.01)

(58) Field of Classification Search
    CPC .......... H02G 15/013; H02G 3/22; H02G 3/24; H02G 3/26; H01B 17/30; H01B 17/301; H01B 17/303
    USPC ..... 174/650, 135, 68.1, 72 A, 152 G, 153 G, 174/137 R, 138 R, 152 R; 16/2.1, 2.2
    See application file for complete search history.

(56) References Cited

U.S. PATENT DOCUMENTS

| | | | |
|---|---|---|---|
| 2009/0324871 | A1 | 12/2009 | Henn |
| 2011/0319269 | A1 | 12/2011 | Oyama et al. |
| 2015/0377545 | A1* | 12/2015 | Freitag .................. B29C 65/72 62/447 |

FOREIGN PATENT DOCUMENTS

| | | |
|---|---|---|
| DE | 102006039621 A1 | 2/2008 |
| DE | 102011001985 B4 | 11/2012 |
| DE | 112010003943 T5 | 11/2012 |
| EP | 1378716 A1 | 1/2004 |
| EP | 1462745 A2 | 9/2004 |
| EP | 2354733 A2 | 8/2011 |
| JP | H08-312880 A | 11/1996 |
| JP | 2012-015260 A | 1/2012 |
| WO | 2014121889 A1 | 8/2014 |

OTHER PUBLICATIONS

Search Report issued in corresponding German Patent Application No. 10 2015 006 558.0 dated Nov. 17, 2015 (8 pages).

* cited by examiner

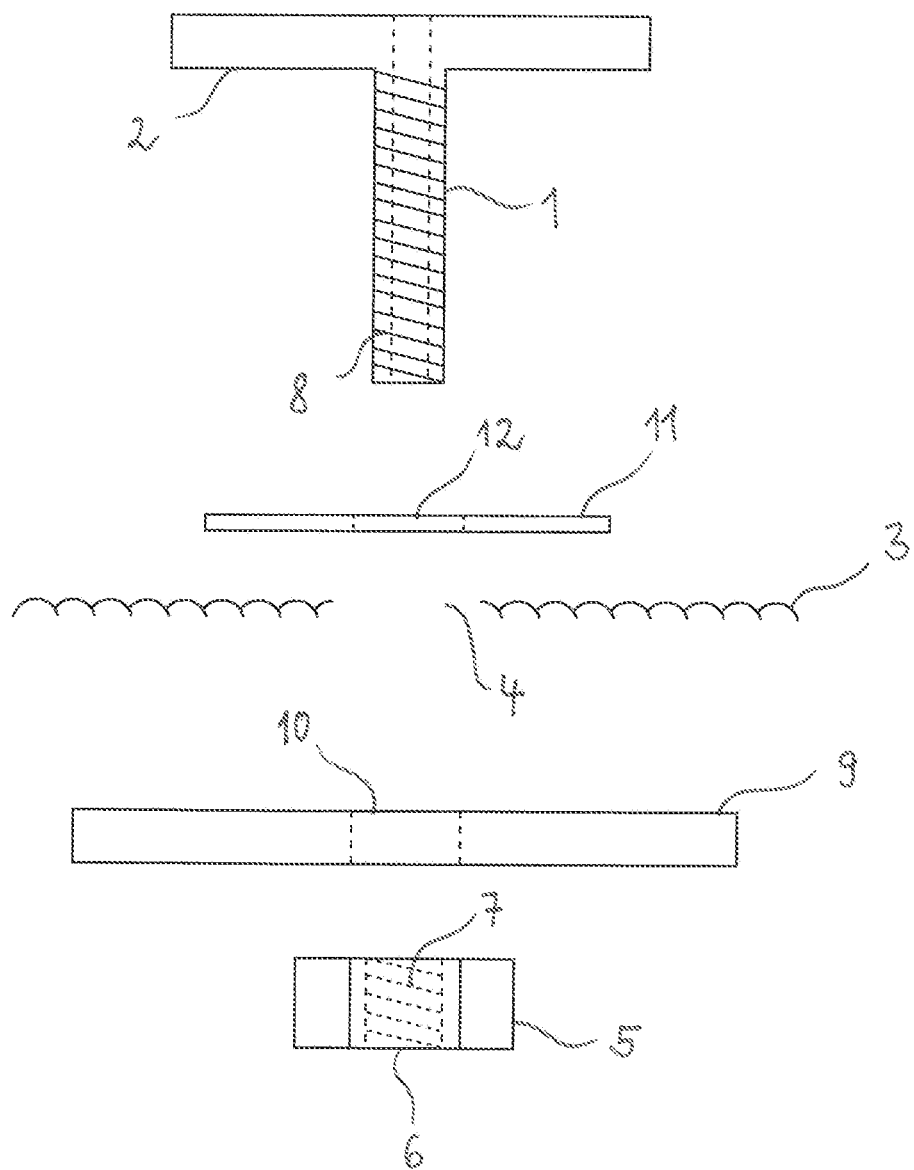

VACUUM-TIGHT THROUGH-FILM BUSHING

This application is a National Stage Application of PCT/EP2016/000122 filed Jan. 25, 2016, which claims priority to German Patent Application No. 10 2015 001 063.8, filed Jan. 29, 2015, and German Patent Application No. 10 2015 006 558.0, filed May 20, 2015, which are incorporated in their entireties by reference herein.

The present invention relates to an apparatus for the vacuum-tight leading of an electric cable through a high barrier film and to a method of preparing a vacuum-tight leadthrough having the apparatus in accordance with the invention.

Vacuum insulation bodies are frequently located in refrigerator or freezer units to achieve a sufficient thermal insulation of the unit.

It is necessary for the manufacture of such a vacuum insulation body to produce a high barrier film that surrounds a filler material that gives the vacuum insulation body the corresponding shape and stability and simultaneously prevents the walls of the vacuum insulation body from directly contacting one another in a state with an applied vacuum. The use of the high barrier film represents an inexpensive variant to maintain a required vacuum level in a vacuum insulation assembly over many years. To provide a sufficient service life for such vacuum-insulated containers, the region surrounded by the high barrier film should be vacuum-tight to a high degree.

It is, however, often desirable to position special sensors or other electrical devices in the region surrounded by a high barrier film, that is a region with an applied vacuum.

It is known in the prior art for the communication with inwardly disposed sensors to communicate through the high barrier film in a contactless manner with the aid of RFID systems. In this respect, it is also customary to arrange passive systems in the vacuum system that are supplied with power by an outwardly contacting system. This procedure, however, suffers from high losses and is additionally not suitable for transferring larger powers.

In accordance with a variation of the conventional system, an inductive transfer of current takes place by coils contacting both sides of the high barrier film. This is, however, likewise resource-intensive since a large coil structure and/or a high voltage to be applied is necessary to transfer larger currents.

It is therefore the object of the present invention to design an inexpensive leadthrough for an electric line through a high barrier film that satisfies the high demands on the vacuum sealing and with which a large power can be transmitted with low loss over the fed through electric line.

This object is achieved by the apparatus for a vacuum-tight leading of an electric line through a high barrier film that has the features in accordance with the subject matter of claim 1.

The apparatus in this respect comprises a hollow pipe having a collar projecting therefrom, a high barrier film having a passage hole through which the hollow pipe runs, and a pressing element that is arranged at the side of the high barrier film, that is remote from the collar, and that urges the high barrier film toward the collar, with the high barrier film being arranged between the collar of the hollow pipe and the pressing element. The apparatus is furthermore characterized in that an electric line extends in the hollow pipe that leads from the one side of the high barrier film to the other side and in that a sealant is present in the hollow pipe for the vacuum-tight closing of the hollow pipe.

The hollow pipe preferably has the collar projecting from the hollow pipe at one of its two ends. How the collar projecting from the hollow pipe is precisely shaped is of subordinate importance for the success of the invention in this respect. Only an extent in the direction orthogonal to the longitudinal direction of the hollow pipe is necessary to implement the invention. It is therefore also possible that the collar has the basic shape of a pipe flange.

A high barrier film represents the diffusion-tight enveloping of a vacuum body that has exceptional insulating properties due to its vacuum property.

A vacuum-tight or diffusion-tight enveloping or a vacuum-tight or diffusion-tight connection or the term high barrier film is preferably understood as an enveloping or as a connection or as a film by means of which the gas input into the vacuum insulation body is reduced so much that the increase in the thermal conductivity of the vacuum insulation body caused by gas input is sufficiently low over its service life. A time period of 15 years, preferably of 20 years, and particularly preferably of 30 years, is to be considered as the service life, for example. The increase in the thermal conductivity of the vacuum insulation body caused by gas input is preferably <100%, and particularly preferably <50%, over its service life.

The surface-specific gas permeation rate of the envelope or of the connection or of the high barrier film is preferably <10-5 mbar*l/s*m$^2$ and particularly preferably <10-6 mbar*l/s*m$^2$ (measured according to ASTM D-3985). This gas permeation rate applies to nitrogen and to oxygen. There are likewise low gas permeation rates for other types of gas (in particular steam), preferably in the range from <10-2 mbar*l/s*m$^2$ and particularly preferably in the range from <10-3 mbar*l/s*m$^2$ (measured according to ASTM F-1249-90). The aforesaid small increases in the thermal conductivity are preferably achieved by these small gas permeation rates.

An enveloping system known from the sector of vacuum panels are so-called high barrier films. Single-layer or multilayer films (which are preferably able to be sealed) having one or more barrier layers (typically metal layers or oxide layers, with aluminum and an aluminum oxide preferably being used as the metal or oxide respectively) are preferably understood by this within the framework of the present invention which satisfy the above-named demands (increase in thermal conductivity and/or surface-specific gas permeation rate) as a barrier to the gas input.

The above-named values or the make-up of the high barrier film are exemplary, preferred values which do not restrict the invention.

The pressing element that is arranged at the side of the high barrier film remote from the collar and that urges the high barrier film toward the collar is preferably actively connected to the hollow pipe. It is thus conceivable that the pressing element is a screw nut and that the hollow pipe represents the male screw with the aid of an external thread.

The passage hole of the high barrier film is arranged such that the hollow pipe passes through it. The surface of the collar facing the high barrier film in interaction with the pressing element clamps the high barrier film between the collar and the pressing element. A vacuum-tight connection can in this respect be provided in the transition region of the high barrier film by a high-quality and precise machining of the hollow pipe or collar and of the pressing element.

The electric line extending through the hollow pipe serves the supply or discharge of electric charges and is preferably connected to a consumer that is arranged at the inner side of the high barrier film and that is located within the region having a vacuum applied.

To prevent a penetration of air into the region having a vacuum applied via the hollow pipe penetrating through the high barrier film, the hollow pipe in which the electric line runs is sealed in a vacuum-tight manner with the aid of a sealant.

In accordance with a further optional, advantageous feature of the apparatus, the pressing element has a passage hole through which the hollow pipe extends. The pressing element is preferably connected to the hollow pipe via a threaded connection. This threaded connection is typical implemented via an internal thread in the passage hole of the pressing element and an external thread of the hollow pipe. It is then possible with the aid of a rotation of the pressing element and of the hollow pipe to clamp the high barrier film interposed between them between the collar and the side of the pressing element facing the collar.

The apparatus furthermore preferably comprises a pressure distributor that is arranged between the film and the pressing element, with the pressure distributor having a passage hole that extends through the hollow pipe. The pressure exerted by the pressing element is distributed over a larger surface by the pressure distributor so that a better and tighter sealing clamping effect can be achieved between the collar and the high barrier film. The surface of the pressure distributor facing the high barrier film preferably corresponds to the negative surface of the collar that faces the high barrier film. It is thus conceivable, for example, that the mutually facing sides of the collar and of the pressure distributor have contact surfaces which extend in parallel and between which the high barrier film can be particularly effectively clamped.

The hollow pipe having the collar and/or the pressing element preferably comprises/comprise metal. It is furthermore likewise of advantage if the hollow pipe is designed in one piece with the collar.

The collar projecting from the hollow pipe preferably extends orthogonally to the longitudinal direction of the hollow pipe so that a right angle is produced in a side view of the hollow pipe with collar in the transition from the hollow pipe to the surface facing the high barrier film. This is, however, not a requirement of the invention. It is rather necessary for a vacuum-tight closure that the surface facing the collar of the high barrier and the surface pressing the high barrier film toward the collar correspond to one another.

The apparatus can therefore comprise a sealing element that comprises a passage hole through which the hollow pipe extends, with the sealing element being arranged between the collar and the high barrier film or between the high barrier film and the pressing element.

The sealing element serves the compensation of technical production irregularities in the mutually corresponding surfaces of the collar and of the pressure distributor or of the pressing element by which the high barrier film is pressed to the collar.

The sealing element preferably comprises polyethylene or consists of polyethylene since a surface sealing of the surfaces can also be ensured with poor surfaces in this respect by the collar or the surface pressing the high barrier film to the collar. The use of a sealing ring that comprises polyethylene or that consists of polyethylene is recommended.

With a sufficiently large pressing force that acts on the sealing element, the sealing element comprising polyethylene or consisting of polyethylene melts and fills up any possible irregularities of the surfaces. It is of particular advantage in this connection that the pressing element is in threaded connection with the hollow pipe since a sufficiently large pressing force can herewith be achieved that can cause a fusion of the sealing element.

A sealing element is also conceivable that completely covers the surface of the collar active in the direction of the film, that is, is designed such that the collar only comes into contact with the sealing element and does not go beyond the sealing element.

The sealant introduced in the hollow pipe for the vacuum-tight closing of the hollow pipe is preferably an epoxy resin. The use of epoxy resin simplifies the manufacture of the apparatus since epoxy resin can be poured into the opening presented by the hollow pipe after the leading through of the electric line. The epoxy resin prevents a diffusion of gas molecules through the hollow pipe closed by epoxy resin, preferably after a hardening procedure.

In this respect, the electric line running through the hollow pipe can be a lacquered wire. A live wire is insulated by the lacquer layer on the live wire and said lacquer layer contributes to an avoidance of short-circuits. It is consequently also possible to lead a plurality of electric lines through a single hollow pipe since a short-circuit does not even occur on a contact of the same due to the lacquer layer that envelopes the wires.

In an embodiment, the electric line is connected to a thermoelectric element. It is alternatively or additionally conceivable that a sensor is connected to the electric line, for example a sensor for monitoring the gas pressure within the vacuum insulation body.

The invention additionally comprises a method of preparing a vacuum-tight leadthrough of an electric line through a high barrier film using one of the above-described apparatus. In this respect, the apparatus is attached to a first piece of a high barrier film and the first piece of the high barrier film is attached to a further piece of a high barrier film. The attachment of the first piece of the high barrier film provided with the apparatus to the further piece of the high barrier film preferably takes place by means of thermal sealing.

The present invention furthermore also comprises a method of manufacturing a thermally insulated container having a temperature-controlled inner space, preferably a refrigerator unit and/or freezer unit, wherein the thermal insulation of the container comprises one or more vacuum insulation bodies having an enveloping of a vacuum-tight film, wherein, before completing the vacuum insulation body within the envelope, at least one thermoelectric element is arranged, a leadthrough through the envelope is prepared, and an electric line is led through this leadthrough.

Before completion should mean in this context that the corresponding steps are carried out before an evacuation of the envelope and preferably before completion of the envelope.

In an embodiment, the leadthrough is manufactured using an apparatus in accordance with the invention and/or within the framework of a method in accordance with the invention.

In an embodiment, the thermoelectric element is connected to the electric line before or after its arrangement within the envelope.

In an embodiment, the electric line is connected to the thermoelectric element before or after its leading through the leadthrough.

The thermoelectric element preferably serves the heating and/or cooling of the temperature-controlled inner space.

The temperature-controlled inner space is either cooled or heated depending on the type of the unit (refrigerator unit, heating cabinet, etc.)

The thermally insulated container has at least one temperature-controlled inner space, with this being able to be cooled or heated so that a temperature results in the inner space below or above the environmental temperature of e.g. 21° C.

An embodiment of thermal insulation is particularly preferred in which a thermal insulation assembly is arranged between the inner wall bounding the inner space and the outer skin of the thermally insulated container and comprises a full vacuum system.

A thermal insulation is to be understood by this which comprises only or primarily an evacuated region which is filled with a core material. The bounding of this region can be formed, for example, by a vacuum-tight film and preferably by a high barrier film. Only such a film body can thus be present between the inner wall of the container, preferably the unit, and the outer skin of the container, preferably of the unit, as the thermal insulation which has a region which is surrounded by a vacuum-tight film, in which there is a vacuum and in which a core material is arranged. A foaming and/or vacuum insulation panels is/are preferably not provided as heat insulation or another heat insulation is not provided, except for the full vacuum system between the inner side and the outer side of the container or unit.

This preferred type of thermal insulation in the form of a full vacuum system can extend between the wall bounding the inner space and the outer skin of the carcass of the container and/or between the inner side and the outer side of a closure element of the container such as a door, flap, lid, or the like.

The full vacuum system can be obtained such that an envelope of a gas-tight film is filled with a core material and is subsequently sealed in a vacuum-tight manner. In an embodiment, both the filling and the vacuum-tight sealing of the envelop take place at normal or environmental pressure. The evacuation then takes place by the connection to a vacuum pump of a suitable interface worked into the envelope, for example an evacuation stub which can have a valve. Normal or environmental pressure is preferably present outside the envelope during the evacuation. In this embodiment, it is preferably not necessary at any time of the manufacture to introduce the envelope into a vacuum chamber. A vacuum chamber can be dispensed with in an embodiment to this extent during the manufacture of the vacuum insulation.

The filling with core material, the vacuum-tight sealing, and the evacuation preferably take place after the worksteps of arranging of the thermoelectric element, of establishing the envelope, and leadthrough, and connection of the electric line. The filling with core material, the vacuum-tight sealing, and the evacuation represent worksteps in one embodiment that are to be considered part of the completion of the vacuum insulation body.

Provision is made in an embodiment that the container manufactured in accordance with the invention is a refrigerator unit and/or a freezer unit, in particular a domestic appliance or a commercial refrigerator. Such units are, for example, covered which are designed for a stationary arrangement at a home, in a hotel room, in a commercial kitchen or in a bar. It can, for example, be a wine cooler. Chest refrigerators and/or freezers are furthermore also covered by the invention. The units in accordance with the invention can have an interface for connection to a power supply, in particular to a domestic mains supply (e.g. a plug) and/or can have a standing aid or installation aid such as adjustment feet or an interface for fixing within a furniture niche. The unit can, for example, be a built-in unit or also a stand-alone unit.

In an embodiment, the container or the unit is configured such that it can be operated at an AC voltage such as a domestic mains voltage of e.g. 120 V and 60 Hz or of 230 V and 50 Hz. In an alternative embodiment, the container or the unit is configured such that it can be operated with DC current of a voltage of, for example, 5 V, 12 V or 24 V. Provision can be made in this embodiment that a plug power supply is provided inside or outside the unit via which the unit is operated. An advantage of the use of thermoelectric heat pumps in this embodiment is that the whole EMC problem only occurs at the power pack.

Provision can in particular be made that the refrigerator unit and/or freezer unit has/have a cabinet-type design and has/have a useful space which is accessible to a user at its front side (at the upper side in the case of a chest). The useful space can be divided into a plurality of compartments which are all operated at the same temperature or at different temperatures. Alternatively, only one compartment can be provided. Storage aids such as trays, drawers or bottleholders (also dividers in the case of a chest) can also be provided within the useful space or within a compartment to ensure an ideal storage of refrigerated goods or frozen goods and an ideal use of the space.

The useful space can be closed by at least one door pivotable about a vertical axis. In the case of a chest, a lid pivotable about a horizontal axis or a sliding lid is conceivable as the closing element. The door or another closing element can be connected in a substantially airtight manner to the carcass by a peripheral magnetic seal in the closed state. The door or another closing element is preferably also thermally insulated, with the thermal insulation being able to be achieved by a foaming and optionally by vacuum insulation panels or also preferably by a vacuum system and particularly preferably by a full vacuum system. Door storage areas can optionally be provided at the inside of the door in order also to be able to store refrigerated goods there.

It can be a small appliance in an embodiment. In such units, the useful space defined by the inner wall of the container has, for example, a volume of less than 0.5 m$^3$, less than 0.4 m$^3$ or less than 0.3 m$^3$.

The outer dimensions of the container or unit are preferably in the range up to 1 m with respect to the height, width and depth.

The invention is, however, not restricted to refrigerator units and/or freezer units, but rather generally applies to units having a temperature-controlled inner space, for example also to heat cabinets or heat chests.

The attachment of the apparatus in accordance with the invention to the high barrier film such that a diffusion-tight electric leadthrough is provided is associated with a plurality of process steps that can typically only be integrated into the manufacturing process of a vacuum insulation assembly with difficulty. It is therefore of advantage to attach the apparatus to a small piece of a high barrier film and to connect this small piece of the high barrier film connected to the apparatus to a further piece of an enveloping film in a subsequent method step. The two mutually connected pieces of the high barrier film then together bound the region having a vacuum to be applied, that is, they represent the outer skin of the vacuum body. The connection region of the two high barrier film pieces naturally has to be designed in a diffusion-tight manner.

Further details and advantages will be described with reference to an embodiment of the present invention shown in the FIGURE. There is shown:

FIG. 1: an exploded representation of some parts of the apparatus in accordance with the invention for the vacuum-tight leading of an electric line through a high barrier film.

FIG. 1 shows the hollow pipe 1 to which a collar 2, that essentially corresponds to a flange, is arranged at one of its both ends. It can additionally be recognized that the hollow pipe 1 is provided with a thread 8 at its outer side. The thread 8 extends, starting from the collar 2, up to the end of the hollow pipe 1 disposed opposite the collar 2.

A sealing element 11 can furthermore be recognized that has a hole 12 through which the hollow pipe 1 is led so that the sealing element 11 contacts the collar 2 of the hollow pipe 1. On an exertion of a sufficiently large pressing force, the sealing element 11 preferably comprising polyethylene or preferably consisting of polyethylene melts and thus compensates irregularities between the collar 2 and the pressing element that presses the high barrier film 3 toward the collar 2 from the other side.

The end of the hollow pipe disposed opposite the collar 2 is furthermore led through a hole 4 of the high barrier film 3 so that a further element plugged onto the hollow pipe 1, namely the pressure distributor 9, can be threaded onto the hollow pipe by its passage hole 10.

The placing on or turning on of the pressing element 5 that has a hole 6 corresponding to the outer diameter of the hollow pipe 1 finally takes place. The hole 6 has an internal thread 7 that can be brought into engagement with the external thread 8 of the hollow pipe 1. The sealing element 11, the high barrier film 3, and the pressure distributor 9 are urged in the direction of the collar 2 projecting from the hollow pipe 1 with the aid of the threaded connection between the pressing element and the hollow pipe so that a diffusion tightness is established along this clamping connection.

In the present example, the pressing element 5 is a screw nut whose male screw is the hollow pipe 1 having the corresponding thread 8. The pressing element 5 is designed such that sufficient pressure can be applied to the clamping connection so that the sealing element 11 melts and compensates any irregularities between the collar 2, the high barrier film 3, and the pressure distributor 9.

The invention further comprises the electric line running through the hollow pipe 1 from the one side of the high barrier film 3 to its other side and the sealant that seals the hollow pipe 1 and that is introduced into the hollow pipe 1 after the leading through of the electric line. Neither element is shown in FIG. 1. The sealant is preferably an epoxy resin that closes the hollow pipe 1 in a vacuum-tight and/or diffusion-tight manner and that can be poured into the opening of the hollow pipe 1.

The electric line that runs through the hollow pipe 1 is a wire than is configured to conduct current. This wire is preferably lacquered to counter a short-circuit. The wire typically connects an electric consumer to its source/drain.

It is clear to the skilled person that not only exactly one electric line can be led through the hollow pipe 1, but rather than a plurality of electric lines can run through the apparatus.

The invention claimed is:

1. An apparatus for the vacuum-tight leading of an electric line through a high barrier film, comprising: a hollow pipe having a collar projecting therefrom; a high barrier film having a passage hole through which the hollow pipe runs; and a pressing element that is arranged at the side of the high barrier film that is remote from the collar, and that urges the high barrier film toward the collar, with the high barrier film being arranged between the hollow pipe and the pressing element, wherein an electric line runs in the hollow pipe that leads from the one side of the high barrier film to its other side; and in that a sealant is present in the hollow pipe for the vacuum-tight closing of the hollow pipe, and said apparatus further having a sealing element comprising a passage hole through which the hollow pipe extends, with the sealing element being arranged between the collar and the high barrier film or between the high barrier film and the pressing element.

2. The apparatus in accordance with claim 1, wherein the pressing element has a passage hole through which the hollow pipe extends.

3. The apparatus in accordance with claim 1, further comprising a pressure distributor with the pressure distributor having a passage hole through which the hollow pipe extends.

4. The apparatus in accordance with claim 1, wherein the hollow pipe with collar and/or the pressing element consists/consist of metal.

5. The apparatus in accordance with claim 1, wherein the collar projecting from the hollow pipe extends orthogonally to the longitudinal direction of the hollow pipe.

6. The apparatus in accordance with claim 1, wherein the sealing element comprises polyethylene or consists of polyethylene.

7. The apparatus in accordance with claim 1, wherein the sealant present in the hollow pipe is an epoxy resin.

8. The apparatus in accordance with claim 1, wherein the electric line running through the hollow pipe is a lacquered wire.

9. The apparatus in accordance with claim 1, wherein the electric line is connected to a thermoelectric element.

10. A method of preparing a vacuum-tight leadthrough of an electric line through a high barrier film using an apparatus in accordance with claim 1, wherein the apparatus is attached to a first piece of a high barrier film.

11. The method in accordance with claim 10, wherein the first piece of the high barrier film is furthermore attached to a further piece of a high barrier film in a diffusion-tight manner.

12. A method of manufacturing a thermally insulated container having a temperature-controlled inner space wherein the thermal insulation of the container comprises one or more vacuum insulation bodies having an enveloping of a vacuum-tight film, wherein, before completing the vacuum insulation body, at least one thermoelectric element is arranged within the envelope, a leadthrough through the envelope is manufactured, and an electric line is led through this leadthrough, wherein the completion of the vacuum insulation body comprises the filling of the envelope with a core material, the vacuum-tight sealing of the envelope, and the evacuation of the envelope.

13. The method in accordance with claim 12, wherein the thermoelectric element is connected to the electric line before or after its arrangement within the envelope; and/or wherein the electric line is connected to the thermoelectric element before or after its leading through the leadthrough.

14. The method in accordance with claim 12, wherein the filling of the envelope with a core material and the vacuum-tight sealing of the envelope take place at normal pressure.

15. The method in accordance with claim 14, wherein the evacuation of the envelope takes place by connection of an interface worked into the envelope to a vacuum pump.

\* \* \* \* \*